(12) United States Patent
Wu et al.

(10) Patent No.: US 11,867,507 B1
(45) Date of Patent: Jan. 9, 2024

(54) EXTENDED REALITY VIRTUAL DISTANCE MEASUREMENT SYSTEM

(71) Applicant: MLOptic Corp, Redmond, WA (US)

(72) Inventors: Pengfei Wu, Bellevue, WA (US); Wei Zhou, Sammamish, WA (US)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 18/143,843

(22) Filed: May 5, 2023

(51) Int. Cl.
*G01B 9/02098* (2022.01)
*G01B 9/02* (2022.01)

(52) U.S. Cl.
CPC ..... *G01B 9/02098* (2013.01); *G01B 9/02041* (2013.01)

(58) Field of Classification Search
CPC .. G06T 17/00; G01B 9/02098; G01B 9/02041
See application file for complete search history.

(56) References Cited

U.S. PATENT DOCUMENTS

| | | | | | |
|---|---|---|---|---|---|
| 4,744,659 | A | * | 5/1988 | Kitabayashi | G01B 11/2441 356/520 |
| 4,872,755 | A | * | 10/1989 | Kuchel | G01J 9/02 356/495 |
| 5,155,551 | A | * | 10/1992 | Vidrine | G01B 9/02071 356/455 |
| 5,546,184 | A | * | 8/1996 | Downs | G02B 27/144 356/451 |
| 5,847,828 | A | * | 12/1998 | Downs | G01B 9/02061 356/451 |
| 6,678,056 | B2 | * | 1/2004 | Downs | G02B 27/145 359/857 |
| 8,687,204 | B2 | * | 4/2014 | Yu | G01N 21/45 356/517 |
| 10,324,023 | B1 | * | 6/2019 | Scheeline | G01J 3/18 |
| 11,525,988 | B2 | * | 12/2022 | Wicker | G02B 27/126 |
| 2012/0038930 | A1 | * | 2/2012 | Sesko | G01B 11/026 356/486 |
| 2012/0194822 | A1 | * | 8/2012 | Buijs | G02B 19/009 356/450 |
| 2014/0293291 | A1 | * | 10/2014 | Tang | G01B 11/0675 356/511 |
| 2015/0272443 | A1 | * | 10/2015 | Sliwa | A61B 5/6885 600/478 |
| 2019/0302369 | A1 | * | 10/2019 | Woltman | G02B 27/0172 |

FOREIGN PATENT DOCUMENTS

| | | | | |
|---|---|---|---|---|
| JP | 2000249510 | * | 9/2000 | G01B 9/02 |
| NL | 198702270 | * | 4/1989 | G01S 17/36 |

* cited by examiner

*Primary Examiner* — Michael P LaPage
(74) *Attorney, Agent, or Firm* — Jong Patent Firm; Cheng Ning Jong; Tracy P. Jong

(57) ABSTRACT

A system for providing a virtual distance of a device under test, the system including a light source, a wedge shear plate including a first surface, a second surface and a wedge angle, wherein the second surface is disposed at the wedge angle with respect to the first surface and the wedge shear plate is configured to be disposed between the device under test and the light source, a first detector configured for receiving a first interference pattern formed as a result of the light source being disposed through and reflected by the first surface and the second surface of the wedge shear plate and a second detector configured for receiving a second interference pattern formed as a result of the light source being disposed through and reflected by the first surface and the second surface of the wedge shear plate.

18 Claims, 16 Drawing Sheets

| VD (m) | 0.5 | 1 | 1.5 | 2 | 3 | 5 | 7 |
|---|---|---|---|---|---|---|---|
| β (deg) | 30 | 18 | 12.5 | 9.5 | 6.5 | 3.8 | 2.8 |
| d (mm) | 0.217069 | 0.245411 | 0.245733 | 0.247021 | 0.247021 | 0.247393 | 0.247343 |
| R (m) | 0.502514 | 1.029949 | 1.511493 | 2.012917 | 2.956466 | 5.079112 | 7.021897 |

| VD (m) | 10 | 15 | 20 | 30 | 50 | 100 | 200 |
|---|---|---|---|---|---|---|---|
| β (deg) | 1.9 | 1.29 | 0.98 | 0.64 | 0.39 | 0.19 | 0.099 |
| d (mm) | 0.247343 | 0.247343 | 0.247343 | 0.247343 | 0.247343 | 0.247343 | 0.247343 |
| R (m) | 9.90646 | 15.09519 | 19.71752 | 30.19415 | 49.55067 | 101.7105 | 199.2272 |

FIG. 13

EXTENDED REALITY VIRTUAL DISTANCE MEASUREMENT SYSTEM

BACKGROUND OF THE INVENTION

1. The Field of the Invention

The present invention relates to a virtual distance measurement system. More specifically, the present invention is directed to a virtual distance measurement system applicable to an extended reality (XR) system.

2. Background Art

The extended reality (XR) technology which includes augmented reality (AR), virtual reality (VR) and mixed reality (MR), allows the creation of three dimensional (3D) representations of objects and scenes in a completely virtual environment or in a user's physical surroundings and accurate placement of virtual objects to create a sense of immersion on the part of the user in the virtual environment. Accurate placements of virtual objects can only occur if the perceived distances between objects in the virtual environment are accurate. Therefore, the accuracy of the virtual distances (VDs) is critically important in XR applications because they play a crucial role in consistently creating, but not breaking a sense of immersion and presence in the virtual environment or among the virtual objects and actual physical surroundings.

In AR, a VD refers to the apparent distance between a user and an augmented object or scene. For example, if an AR device places a virtual object on a table in front of the user, the VD should be consistent with the actual distance between the user and the table. If the VD is too far or too close, it can break the illusion of the augmented scene and make it difficult for the user to interact with the virtual object in a natural way.

In VR, a VD refers to the distance between a user and a virtual object or scene within a virtual environment. The VD should be consistent with the user's expectations based on the user's real world experiences. For example, if the user is walking through a virtual forest, the VDs between the trees and the user should be similar to the distances between the trees and the user in the real world. If a VD is incorrect, it can cause discomfort or even motion sickness in the user and break the sense of immersion in the user's virtual environment.

The accuracy of VD is also critically important in the head-up display (HUD) technology, which is a type of display that presents information or graphics to the user in the user's field of view without obstructing the user's view of the real world. In HUDs, a VD refers to the perceived distance between the displayed information and the user's eyes. If the VD is too far or too close, it can make it difficult for the user to read or process the information quickly and accurately. In certain situations, e.g., driving or flying, HUDs are designed to provide important information in real time to improve situational awareness and reduce the need for the user to look away from the task at hand. In these cases, accurate and consistent VDs are critical to ensure that the displayed information is integrated seamlessly into the user's perception of the real world and does not distract or disorient the user. Therefore, in HUD technology, VDs play a crucial role in providing information effectively and without disrupting the user's attention or perception of his or her surroundings.

VDs are created using advanced optics, sensors and computer vision algorithms. However, optics quality, sensor size, optical alignment as well as manufacturing tolerance may not be perfect. Small errors can cause large changes of VDs, especially for XR applications due to the high sensitivity nature of the devices which contains various highly integrated nano optics and micro devices with mechanical tolerances from nanometers to micrometers. Incorrect VDs produce inaccurately replicated images in the real world due to the wrong distance perception between realistic and immersive virtual environments. This affects the user experience and sense of immersion significantly.

There exists a need for a new technique to precisely measure VDs to ensure accurate projections of virtual images and to create a seamless and immersive AR or VR experience for users. In the real world, humans use physical cues, e.g., size, depth, and perspective to estimate distances. However, in virtual environments, these cues may not exist or may be altered, making it difficult to accurately judge distances. For example, in AR and VR applications, the devices come in different sizes and resolutions, which can affect the perceived distance. A smaller display may make objects appear closer than they are while a larger display may make them seem farther away.

There exists a need for a system suitable for providing large VD measurements of, e.g., up to about 200 m using, e.g., a small aperture, e.g., of only 3 mm, of a device under test as compared to prior art equipment capable of providing VD measurements, e.g., of only about 2 m, e.g., an optical imaging camera used in metrological tests of XR products.

SUMMARY OF THE INVENTION

In accordance with the present invention, there is provided a system for providing a virtual distance (VD) of a device under test, the system including:
(a) a light source;
(b) a wedge shear plate including a first surface, a second surface and a wedge angle, wherein the second surface is disposed at the wedge angle with respect to the first surface and the wedge shear plate is configured to be disposed between the device under test and the light source;
(c) a first detector configured for receiving a first interference pattern formed as a result of the light source being disposed through and reflected by the first surface and zo the second surface of the wedge shear plate; and
(d) a second detector configured for receiving a second interference pattern formed as a result of the light source being disposed through and reflected by the first surface and the second surface of the wedge shear plate,
wherein the virtual distance is determined based on one or more properties of the first interference pattern, one or more properties of the second interference pattern, one or more properties of the light source and one or more properties of the wedge shear plate.

In one embodiment, one or more properties of the first interference pattern include a fringe distance (d), a shear distance (s) and an angular deviation ($\beta$). In one embodiment, one or more properties of the second interference pattern include an angular deviation ($\beta_0$). In one embodiment, one or more properties of the light source include a wavelength ($\lambda$) of the light source. In one embodiment, one or more properties of the wedge shear plate include a refractive index (n) of the wedge shear plate. In one embodiment, the virtual distance is determined according to formula $r=-(sd)/(\lambda(\tan \beta - \tan \beta_0))$, wherein r=virtual distance, s=shear distance of the first interference pattern, d=fringe distance of the first interference pattern, $\lambda$=wavelength of the light source, $\beta$=angular deviation of the first interference pattern and $\beta_0$=angular deviation of the second interference pattern. In one embodiment, the first detector is directed in a first direction and the second detector is directed in a second direction opposite of the first direction. In one embodiment, the light source includes a laser beam. In one embodiment, the laser beam is a single collimated plane-wave laser beam or a sphere-curved wave laser beam. In one embodiment, the light source is one of a reflective surface and a reflective plane. In one embodiment, the device under test can be a display panel module, a light engine, a near-eye display, a holographic waveguide, a holographic projector, a head-up display (HUD), a naked eye 3D TV, an Extended Reality (XR) glass or any device producing VDs and virtual images. In one embodiment, the wedge angle is about 0.005-0.05 degrees.

An object of the present invention is to provide a system suitable for providing a VD of a device under test.

Another object of the present invention is to provide a system suitable for providing a VD of a device under test with the benefit of corrections to the VD with a reference.

Another object of the present invention is to provide a system suitable for providing a long VD of a device under test.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 13 is a table depicting correlating VDs, angular deviations β of interference patterns, fringe distances d and simulated VDs or r values.

PARTS LIST

2—system
4—light source
6—device under test (DUT)
8—wedge shear plate
10—first detector
12—second detector
14—display panel module
15—position at which display panel or surface is disposed
16—position at which misaligned display panel or surface is disposed
18—aperture
19—aperture size
20—reflected beam from first surface
22—reflected beam from second surface
24—holographic waveguide
26—extended reality (XR) glass
28—collimated incident beam
30—angular deviation
32—fringe distance or spacing between fringes
34—shear distance
36—imaging lens
38—object distance
40—depth of field
42—depth of focus
44—circle of confusion
46—first surface of wedge shear plate
48—second surface of wedge shear plate
50—first interference pattern or interferogram
52—second interference pattern or interferogram
54—distance between aperture and misaligned display panel or surface
56—imaging lens
57—angle between first or second surface of wedge shear plate and light source or DUT

PARTICULAR ADVANTAGES OF THE INVENTION

The present system is suitable for providing large virtual distance (VD) measurements of, e.g., up to about 200 m using, e.g., a small aperture, e.g., of only 3 mm, of a device under test as compared to prior art equipment capable of providing VD measurements, e.g., of about 2 m, e.g., an optical imaging camera used in metrological tests of extended reality (XR) products, e.g., those capable of obtaining Modulation Transfer Function (MTF), boresight and color imaging measurements.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
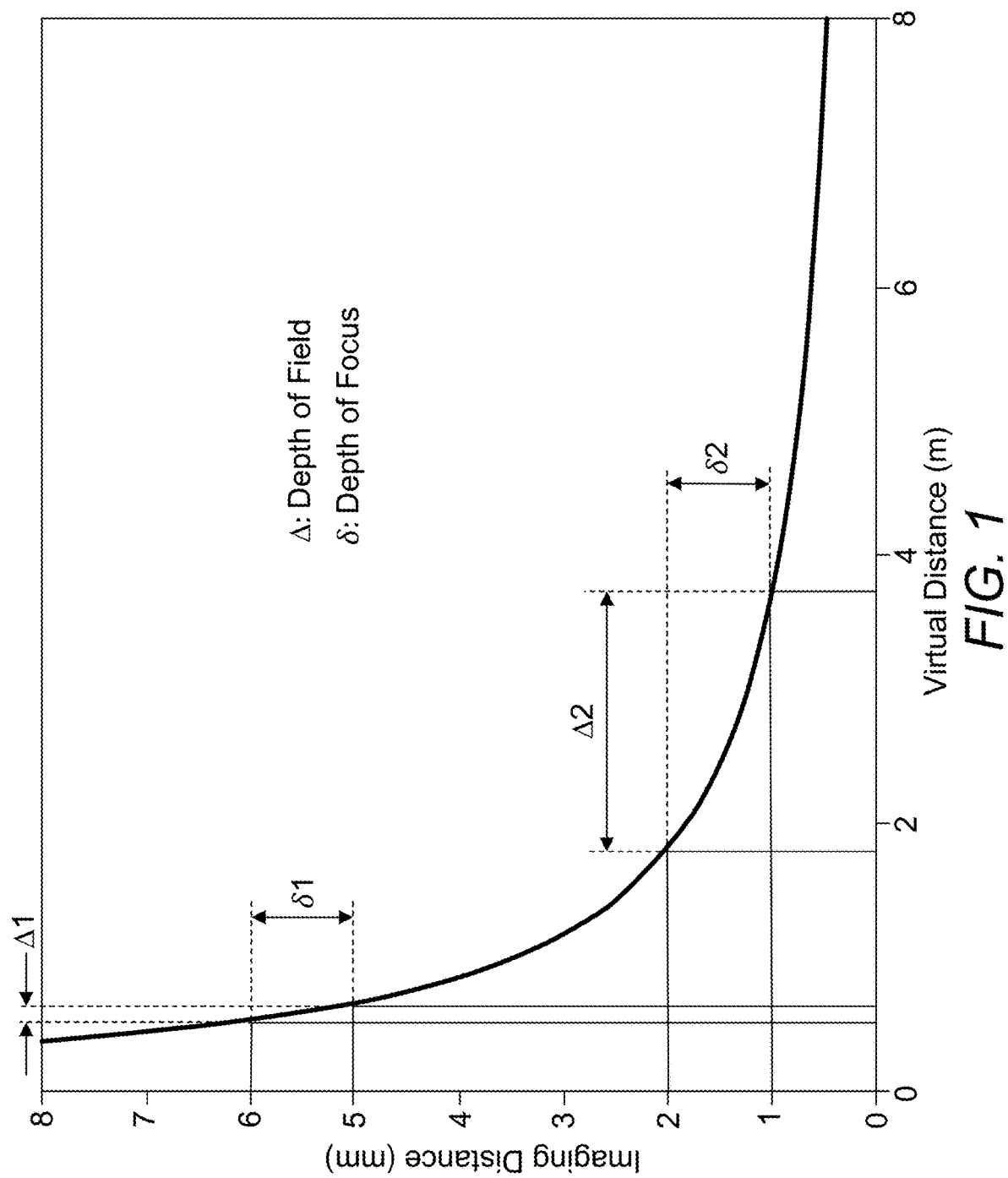
FIG. 1 is a chart depicting imaging distances with respect to virtual distances (VDs).
Figure 2:
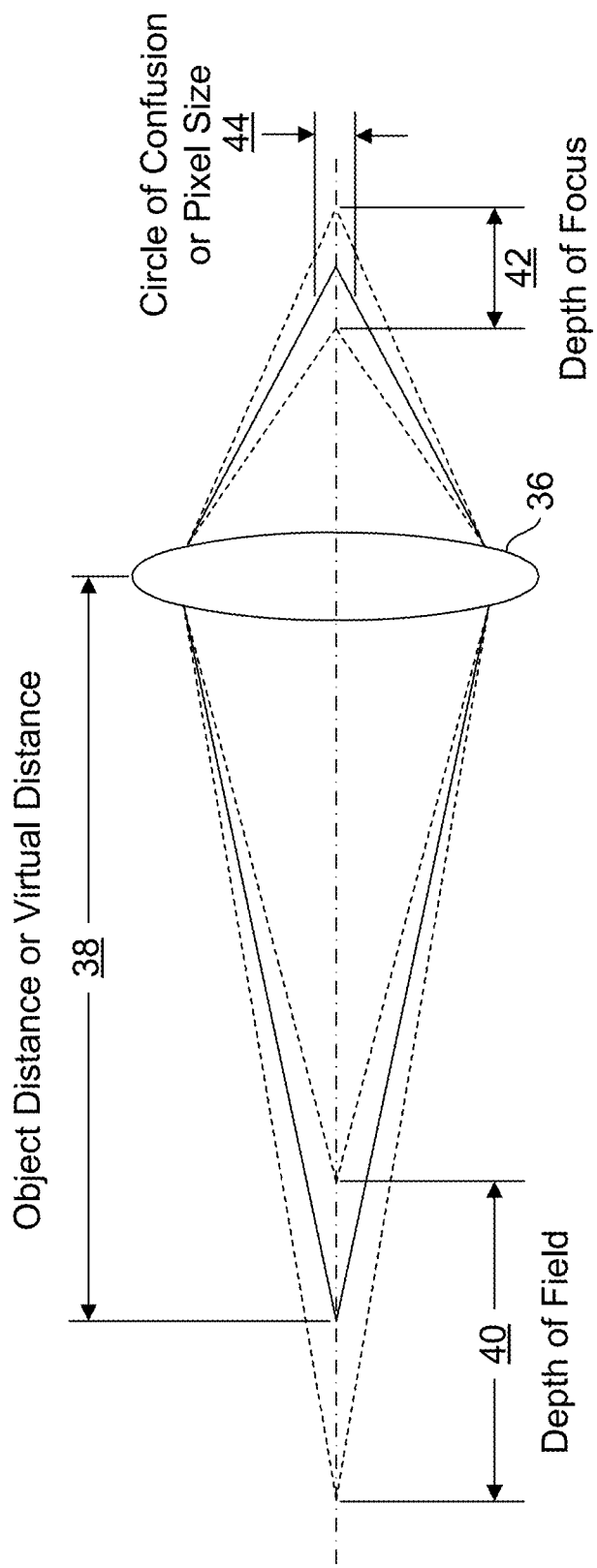
FIG. 2 is a diagram illustrating a standard optical imaging system in which the depth of field on the object side is related to the depth of focus on the image side.
Figure 3:
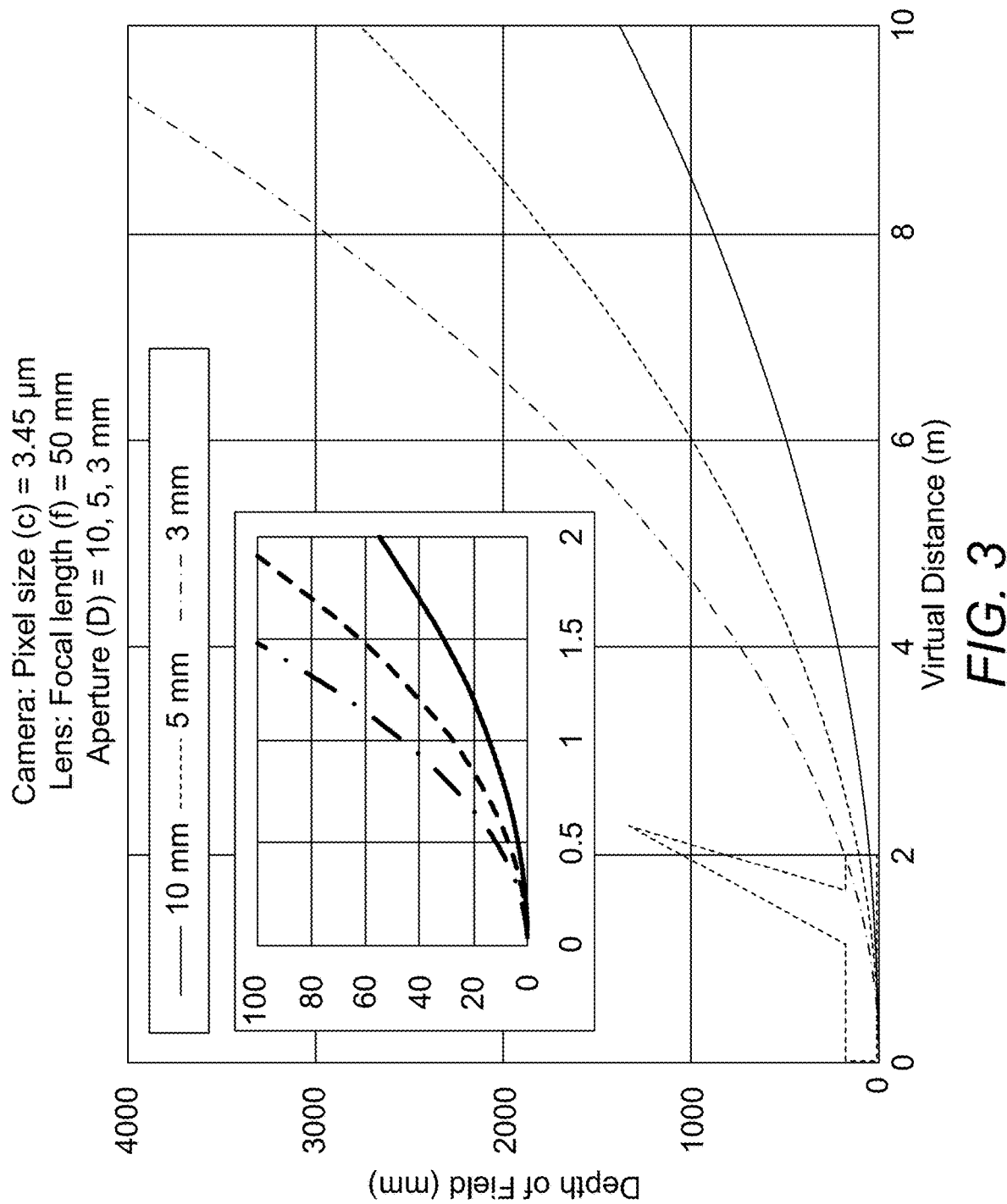
FIG. 3 is a chart depicting the depths of field with respect to VDs of an imaging lens.
Figure 4:
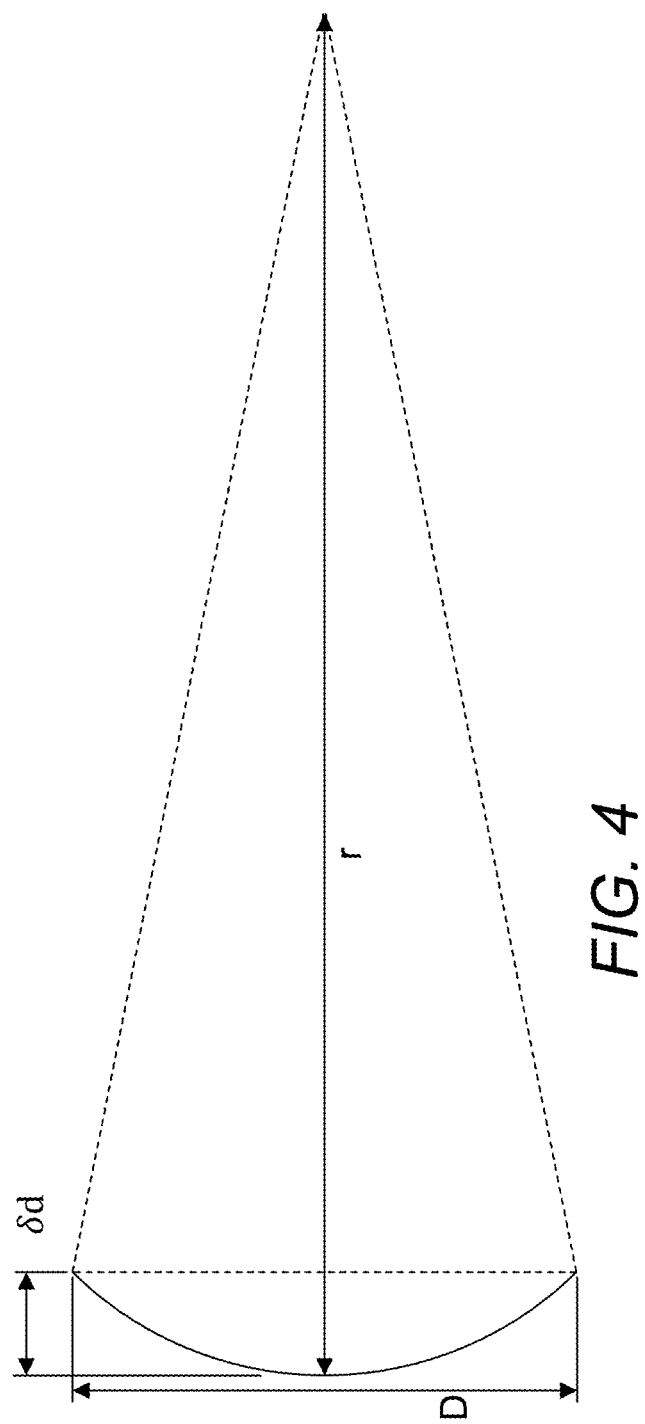
FIG. 4 is a diagram depicting limitations of the use of an imaging lens to provide VDs is where a wavefront change becomes unmeasurable by the lens when a VD is too long.

FIG. 1 is a chart depicting imaging distances with respect to virtual distances (VDs). FIG. 2 is a diagram illustrating a standard optical imaging system in which the depth of field on the object side is related to the depth of focus on the image side. FIG. 3 is a chart depicting depths of field with respect to VDs of an imaging lens. Due to the laws zo of physics and technical challenges, it is very difficult to precisely measure a VD, especially with small optical apertures. VDs of extended reality (XR) device are normally measured by using optical imaging cameras used in metrological tests of XR products, e.g., those capable of obtaining Modulation Transfer Function (MTF), boresight and color imaging measurements. However, with the increase of a VD 38, the depth of field 40 becomes larger for an imaging lens 36, resulting in large uncertainty of the VD measurement. For this reason, the imaging lens is only good for very short VD measurements. Referring to FIG. 2, the approximate depth of field (DOF) 40 can be determined using the following formula:

$$DOF = (2r^2 c)/(fD)$$

where r is a given VD, c is the pixel size 44 of the imaging camera, f is the focal length and D is the aperture size 19. Due to the DOF, a VD measurement has a large uncertainty, especially for a long VD. The DOF 40 of an imaging lens refers to the range of distances in a scene that appears acceptably sharp in the resulting image. Specifically, it refers to the distance between the nearest and farthest objects in a scene that appear in sharp focus. The DOF is affected by several factors, including the aperture of the lens (the size of the opening through which light enters the lens), the distance between the lens and the subject, and the focal length of the lens. A smaller aperture, a smaller f and a longer VD will typically result in a deeper DOF, while a larger aperture (smaller f-number) and a longer focal length will result in a shallower DOF. FIG. 4 is a diagram depicting limitations of the use of an imaging lens to provide VDs in extended reality (XR) applications. With a long object distance r, a wavefront change $\delta d$ is very small, especially with small aperture size D.

$$\delta d \approx (D/2)*\tan(\text{atan}(D/(2r))) = D^2/(4r)$$

For example, to measure an object distance of 10 meter away, the wavefront change is only 0.225 μm for a 3-mm aperture lens. This is also the main reason the imaging lens has such a large uncertainty to measure VDs in XR applications.

In XR metrology, an imaging lens aperture is normally disposed at about 2-5 mm in diameter in order to match the human eye pupil size. A small aperture further extends the depth of field 40 and thus significantly increasing VD measurement errors, making the imaging method impractical for long VD measurements. For example, to measure a 1.5 m VD, the measurement uncertainty is as large as 100, 60 and 30 mm when using an aperture of 3, 5 and 10 mm, respectively.

Interferometry is one of the effective techniques to precisely measure small wavefront variations when an object to be measured is disposed at a distance. For example, a is lens with 3 mm aperture may measure 1.5 m in VD with about 0.1 mm accuracy. For longer VDs (>1.5 m), the measurement will quickly become unacceptable. However, the wavefront change is as large as 1.5 μm for the 1.5 m VD and can be precisely measured using interferometry, a technique useful for measuring wavefront changes in the range of nanometers.

Figure 5:
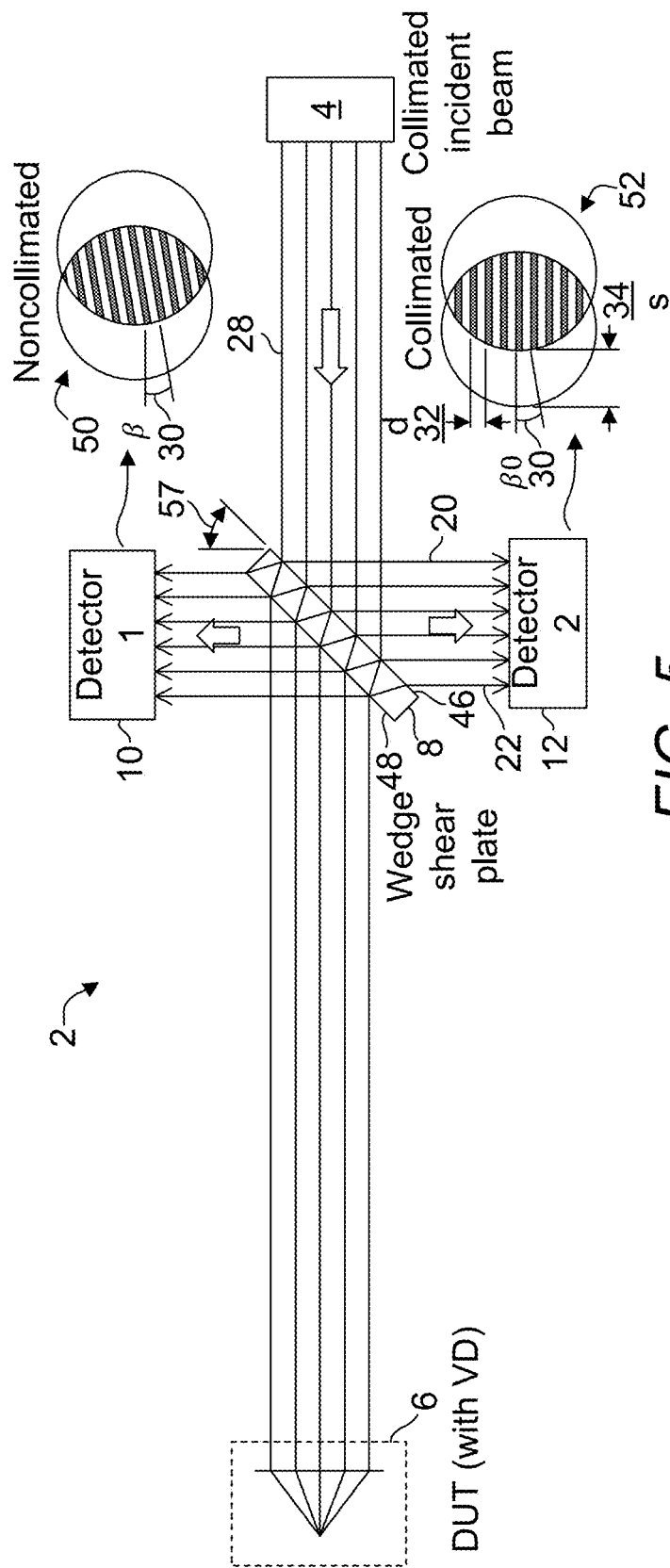
FIG. 5 is a side view of a system useful for measuring VDs of a device under test (DUT).
Figure 6:
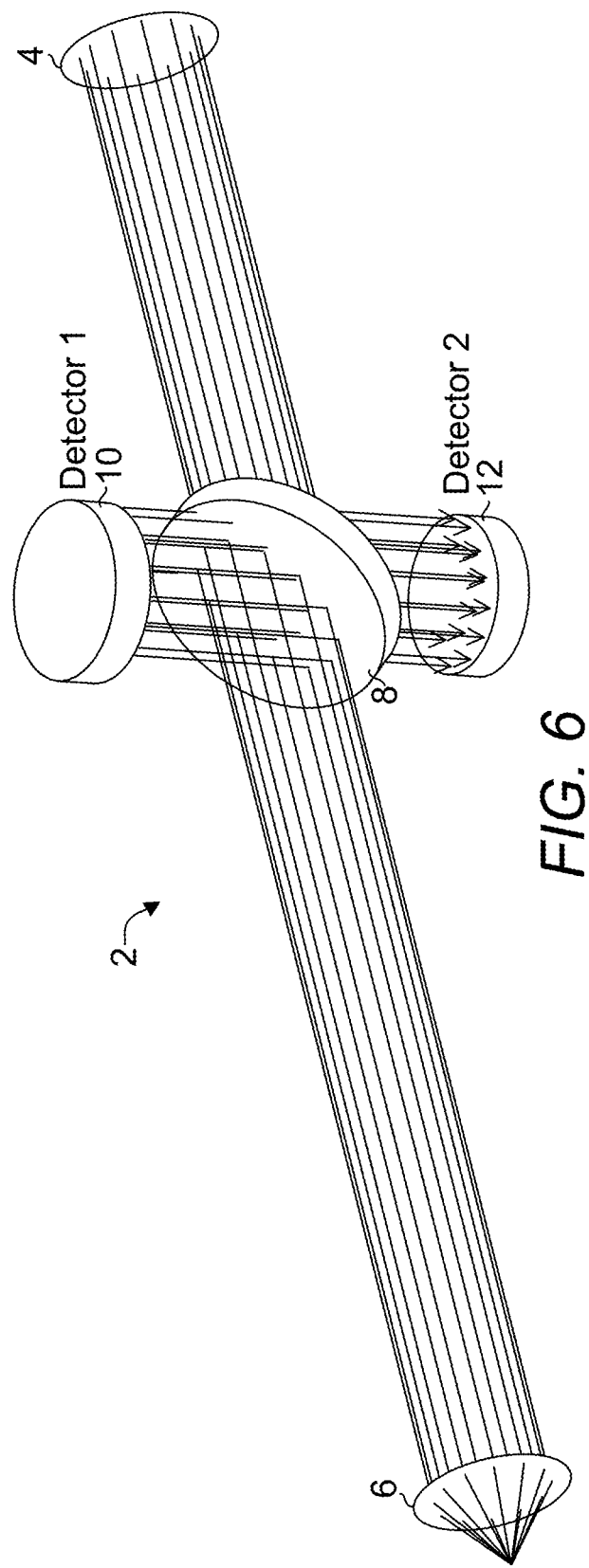
FIG. 6 is a top perspective view of a system useful for measuring VDs of a DUT.

A system useful for overcoming the shortcomings of conventional systems or techniques disclosed elsewhere herein is shown in FIGS. 5 and 6. FIG. 5 is a side view of a system 2 useful for measuring VDs of a device under test 6 (DUT). FIG. 6 is a top perspective view of a system 2 useful for measuring VDs of a DUT 6. The system 2 is useful for providing a VD of a device under test 6 and includes a light source 4, a wedge shear plate 8 including a first surface 46, a second surface 48 and a wedge angle, a first detector 10 and a second detector 12. The first detector 10 is directed in a first direction and the second detector 12 is directed in a second direction opposite of the first direction. The second surface 48 is disposed at the wedge angle with respect to the first surface 46. The wedge shear plate 8 is essentially a thin, flat piece of glass or other transparent material that is wedge-shaped, with one end thicker than the other. The wedge shear plate 8 is configured to be disposed between the device under test 6 and the light source 4. In shear interferometry, a plane wave is used to create interference patterns. When a plane wave of light is incident on the wedge shear plate, i.e., a transparent object, it is partially reflected and partially transmitted through the object. The transmitted light wave interferes with the reference wave, which is typically a plane wave that has not interacted with the object. Here, a plane wave from the light source 4, e.g., a laser beam, incident upon the DUT 6 through the wedge shear plate 8, creates a reflected wavefront detected by both detectors 10, 12. The first detector 10 is configured for receiving a first interference pattern 50 formed as a result of the light source 4 being disposed through and reflected by the first surface 46 and the second surface 48 of the wedge shear plate 8. The second detector 12 is configured for receiving a second interference pattern 52 formed as a result of the light source being disposed through and reflected by the first surface 46 and the second surface 48 of the wedge shear plate 8. The VD is determined based on one or more properties of the first interference pattern, one or more properties of the second interference pattern, one or more properties of the light source 4 and one or more properties of the wedge shear plate 8. Referring to FIG. 5, it shall be noted that the first interference pattern 50 is a result of non-collimated beam reflected by the wedge shear plate 8 and the fringes of the first interference pattern 50 appear as fringes disposed at an angular deviation 13 or part 30 with respect to a horizontal line. The $\beta_0$ or part 30 is the angular deviation of the second interference pattern 52. It shall be noted that although $\beta_0$ appears to be substantially zero, i.e., the fringes appear to be parallel to a horizontal line, in reality, this may not be the case due to linear and angular discrepancies introduced in the mounting of various optical components in the system. The use of the second detector 12 which acts as a reference indicator of whether the light source 4 is collimated, is critical in the accuracy of the VDs determined using this system. If the light source 4 itself is non-collimated, this defect will appear as an angular deviation in the fringes of the second interference pattern. Therefore, if the light source 4 is imperfect, this defect must be considered and removed from the computation of the DUT's VD. Therefore, is the VD or r can be determined according to equation A: $r = -(sd)/(\lambda(\tan \beta - \tan \beta_0))$, wherein s is the shear distance 34 of the first interference pattern 50, d is the fringe distance 32 of the first interference pattern 50 and $\lambda$ is the wavelength of the light source 4. It shall be noted that the angular deviation of the second interference pattern, i.e., $\beta_0$, is a factor affecting r. With no angular deviation, i.e., $\beta_0=0$, this reference angular deviation does not impart a change to the r computation as $\tan \beta_0=0$. However, it can be seen that the second detector can be used to produce a reference that removes the r computation errors due to a non-collimated light source. In one embodiment, the light source includes a laser beam. In one embodiment, the laser beam is a single collimated plane-wave laser beam or a sphere-curved wave laser beam. The wedge shear plate is disposed between the DUT and the light source, e.g., at an angle 57 of 45 degrees to each of the DUT and the light source. The 45-degree angle is chosen because it provides a balance between the sensitivity of the wedge shear plate and its ease of alignment in the optical path between the DUT and the light source and it allows the incident light to be split into two beams that are polarized perpendicular to each other, which is necessary for creating interference fringes.

Figure 7:
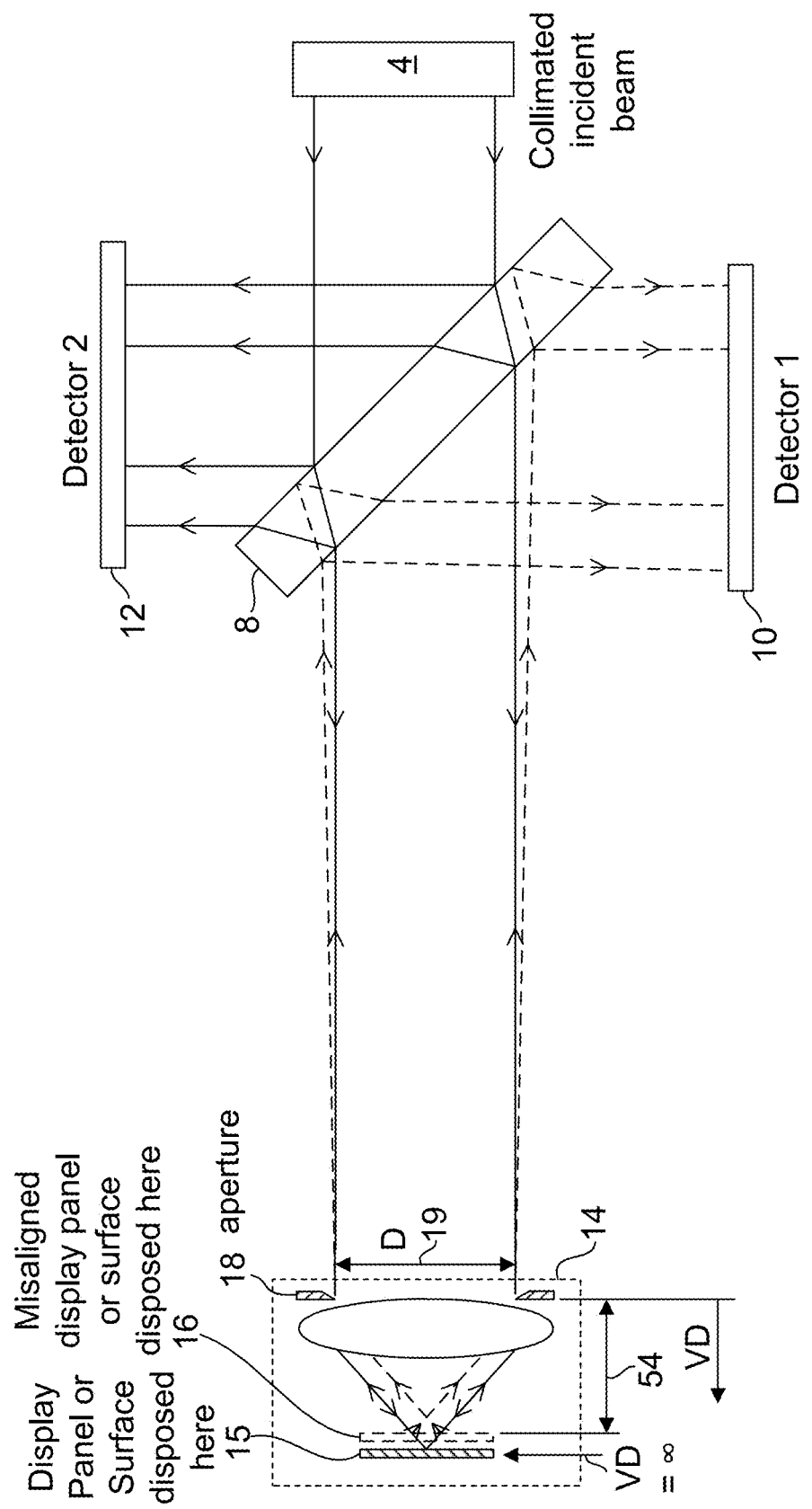
FIG. 7 is a diagram depicting a system useful for measuring VDs of a display panel module.
Figure 8:
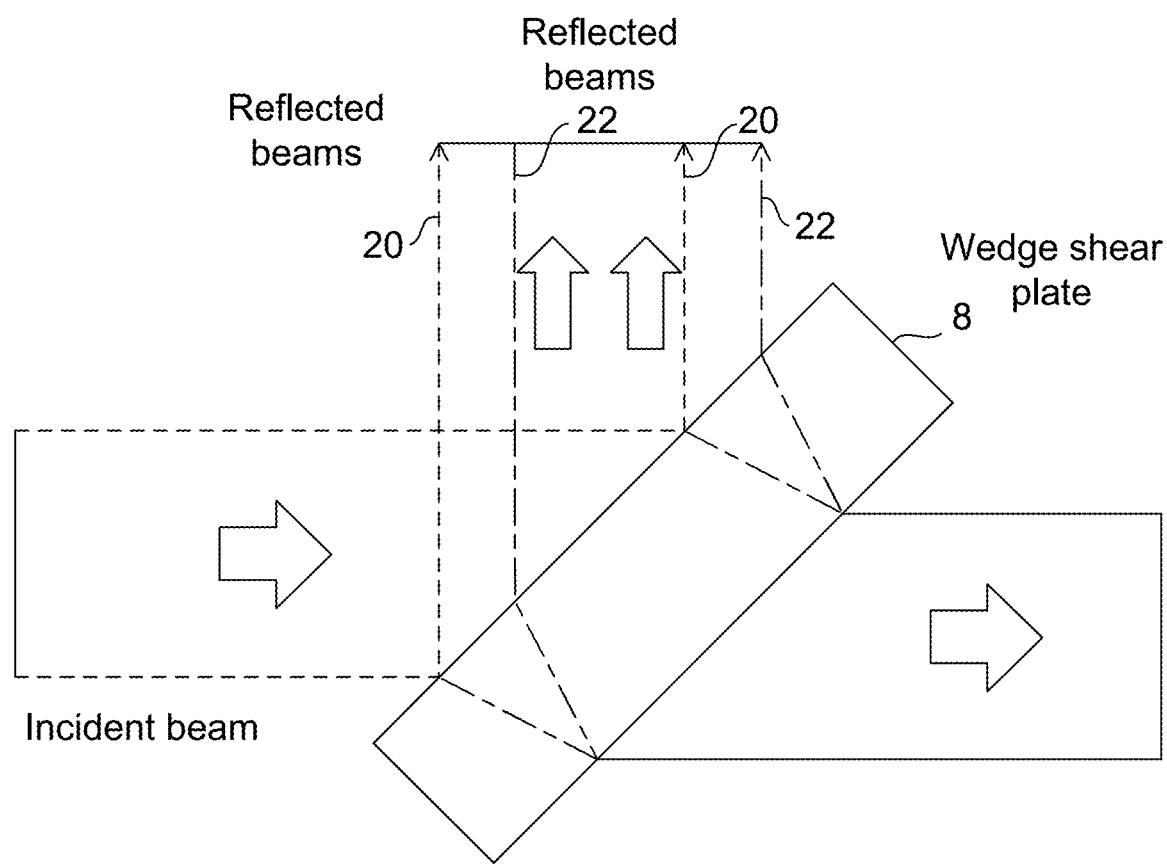
FIG. 8 is a diagram depicting beam splitting and shearing using a wedge shear plate.
Figure 9:
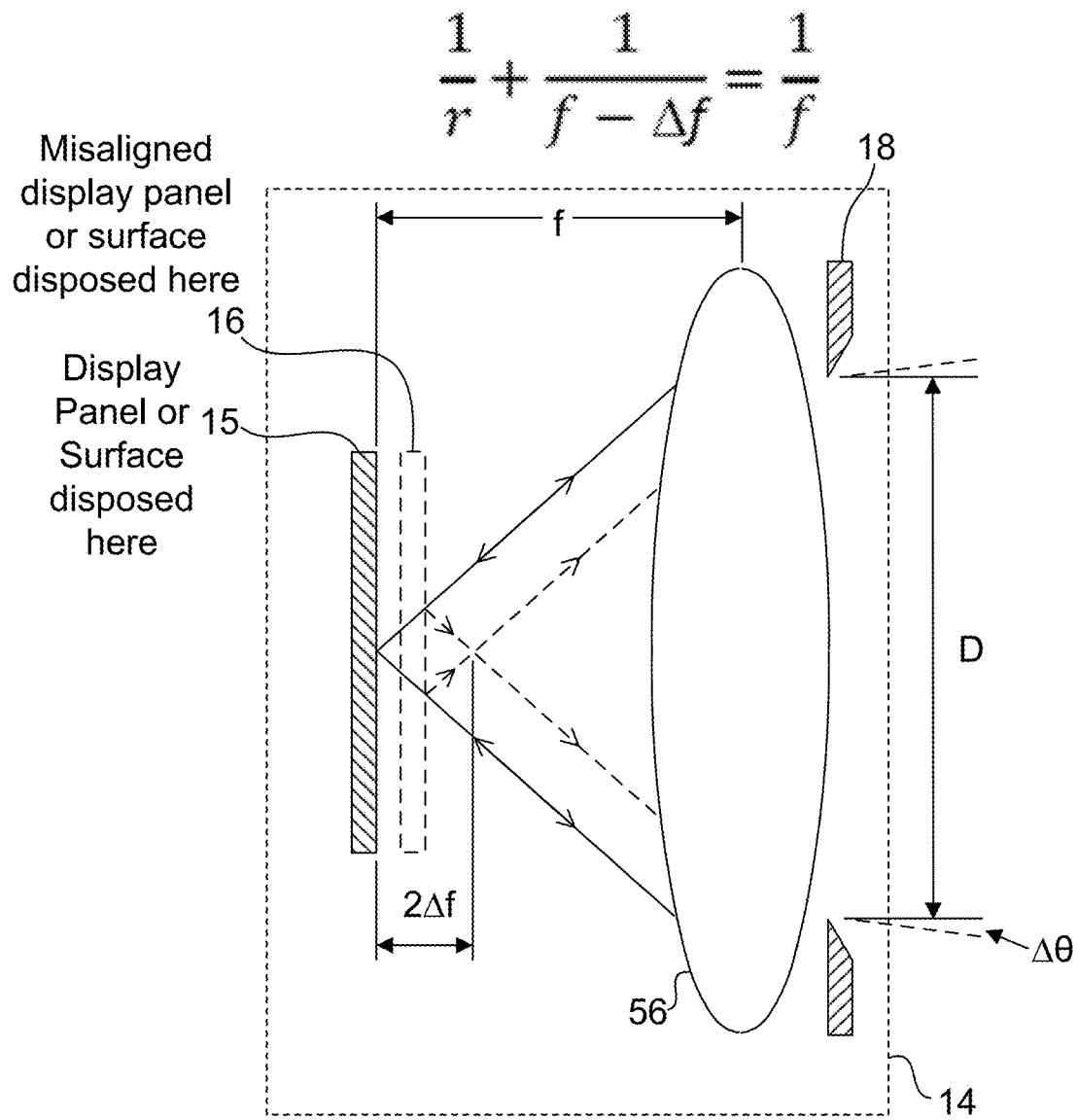
FIG. 9 is a diagram depicting a misaligned display panel wherein the misalignment can be determined and corrected.

FIG. 7 is a diagram depicting a system useful for measuring VDs of a display panel module 14, e.g., a micro display panel module. FIG. 8 is a diagram depicting beam splitting and shearing using a wedge shear plate 8. For a micro display panel used in XR applications, the optical alignment of its components is critical and the required mechanical tolerance is extremely tight. As such, precise VD measurements are required at each manufacturing stage and assembling process to ensure the quality of the product producing correct virtual images. As disclosed elsewhere herein, from a VD value, the misalignment (e.g., $\Delta f$, from infinity VD) of the micro display panel can be determined and then corrected. Referring to FIGS. 5-7, it shall be noted that the device under test 6 shown in FIG. 5 is replaced with a display panel module 14 and distance 54 can be calculated based on a measured VD value. Referring to FIG. 8, the path difference between the two reflected wavefronts (one reflected by the first surface 20 and the other by the second surface 22) is increased or decreased from the case of perfect collimation of an incident beam depending on the sign of the wavefront curvature. The beam's wavefront radius of curvature r can be determined according to the formula disclosed elsewhere herein. The same r value is also the VD that a human eye perceives an object or a lens captures light waves from a point source. The display panel module 14 includes a display panel or surface 15 intended to be disposed at a position as shown. However, the system 2 indicates, from one or more VD measurements that the display panel 15 had been misplaced at position 16 as this position does not coincide with the position of the display panel 15 as shown. If a projection of a VD at infinity is desired, i.e., the reflected light from the DUT is collimated through the aperture 18, the display panel is required to be disposed at position 15. However, due to errors, e.g., mechanical tolerances, the display panel may have been placed outside of position 15 and at this incorrect position, it will project a new VD that is not infinity. This defect can be measured using the present shearing interferometer system and adjustments of the display panel position are needed to dispose the display panel at the correct position. Based on the new measured VD value, the misaligned position can be calculated based on equation $(1/r)+(1/(f-\Delta f))=1/f$ where r is the VD and f is focal length of the imaging lens 56 and this value can be resolved based on the r value determined. FIG. 9 is a diagram depicting a misaligned display panel wherein the misalignment can be determined and corrected. A total of two detectors are used to monitor both incident beam interference patterns. A VD can be calculated based on the $\Delta\theta$ embodied as an angular deviation 30 in an interference pattern. An angular deviation $\beta$ evidenced in an interference pattern represents a degree of deviation or $\Delta\theta$ from that of perfect collimation of the reflected light from the DUT. Any wavefront aberrations are also inherently corrected when a misalignment has been corrected.

Alternatively, the use of a light source can be eliminated if the DUT is a device capable of emitting a narrow band light, e.g., one color of RGB. Such device includes, but not limited to, a MicroLED, a Liquid Crystal on Silicon (LCoS), a Digital Micrometer Device (DMD), etc. When any of such DUTs is used, the shearing interferometer is configured to probe the light wave from a point, e.g., by turning on one pixel, at the center of display the DUT. The light source may then be substituted with one of a reflective surface and a reflective plane provided that sufficient collimated plane waves 28 can be reflected onto the wedge shear plate 8 by the reflective surface or plane.

Figure 10:
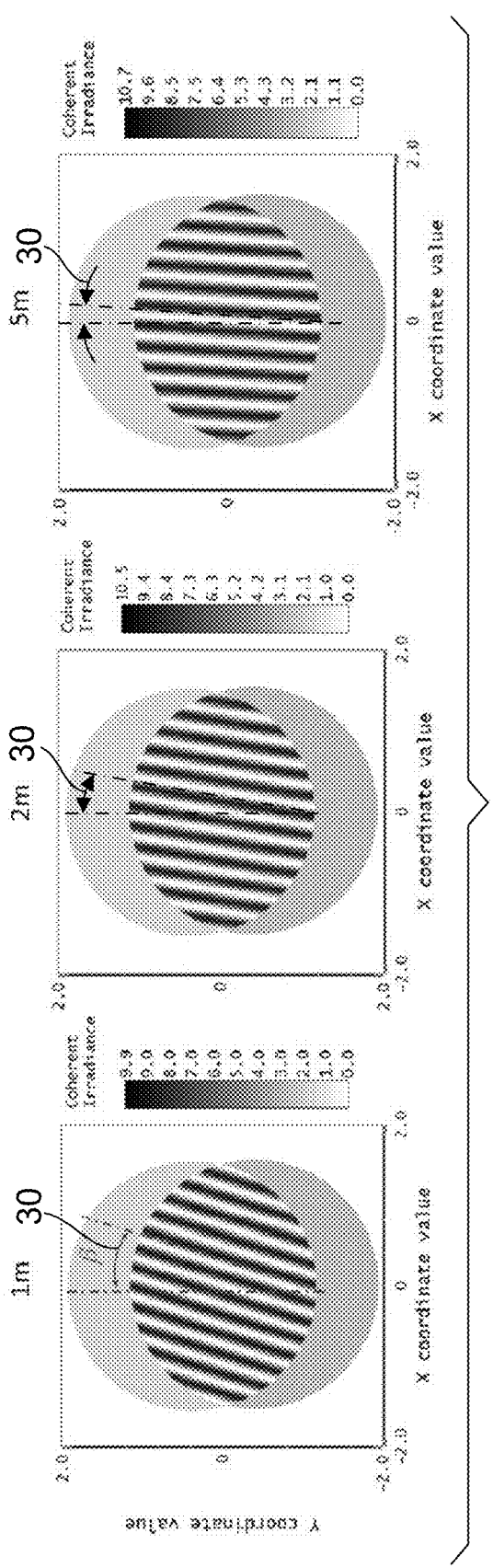
FIG. 10 are diagrams depicting interference patterns obtained for various VDs.

FIG. 10 are diagrams depicting interference patterns 50 obtained for various VDs, e.g., of 1 m, 2 m and 5 m with a setup similar to one found in FIG. 7. The aperture size is 3 mm and the wavelength of the light source is disposed at 550 nm. The wedge shear plate thickness is about 1 mm and the wedge angle is 0.05 degrees tilted along an axis perpendicular to an incident plane. It shall be noted that the angular deviation $\beta$ or part 30 becomes larger at smaller VDs or when the VD is not infinity.

Figure 11:
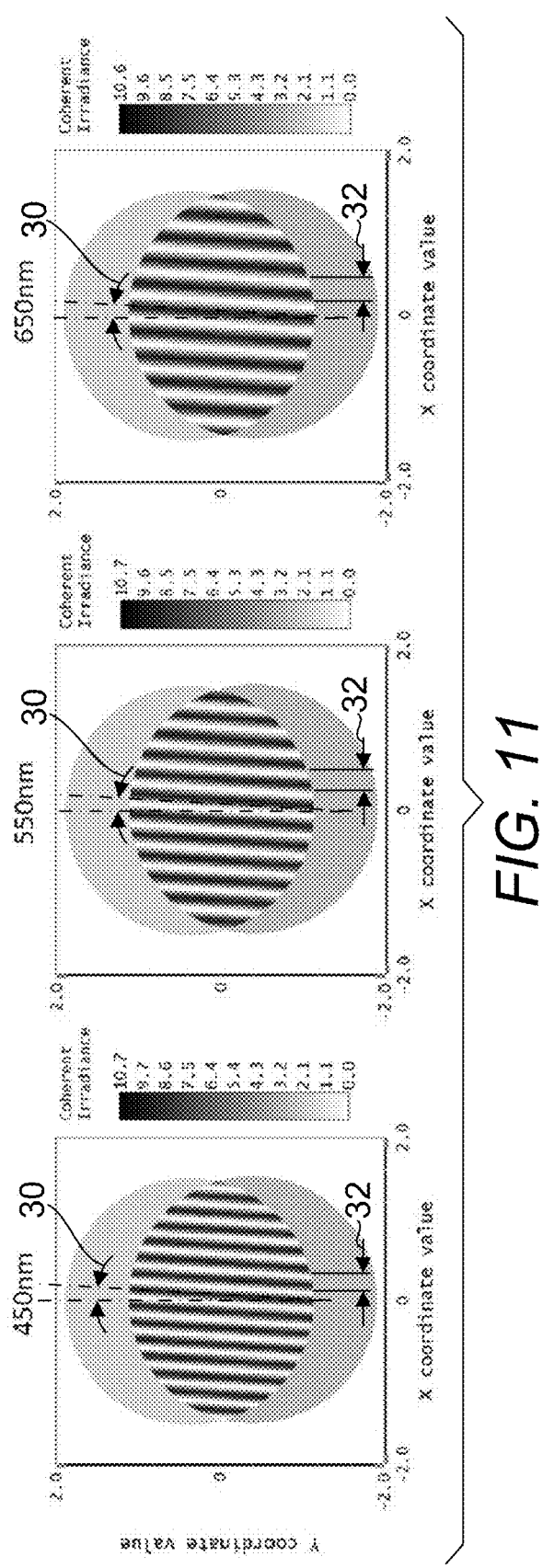
FIG. 11 are diagrams depicting interference patterns of various wavelengths of the light source.

FIG. 11 are diagrams depicting interference patterns corresponding to various wavelengths of the light source 4, e.g., 450 nm, 550 nm and 650 nm with a setup similar to one found in FIG. 7. The VD or r is 5 m. Again, the wedge shear plate thickness is about 1 mm and the wedge angle is 0.05 degrees tilted along an axis perpendicular to an incident plane. It shall be noted that the fringe distance 32 is proportional to the incident wavelength of the light source 4 which is consistent with the equation $d=\lambda/(2n\alpha)$ where d is the fringe distance or spacing that is perpendicular to shear between two consecutive fringes, $\lambda$ is the incident wavelength of the light source 4, n is the refraction index of the wedge shear plate 8 and $\alpha$ is the wedge angle of the wedge shear plate 8.

Figure 12:
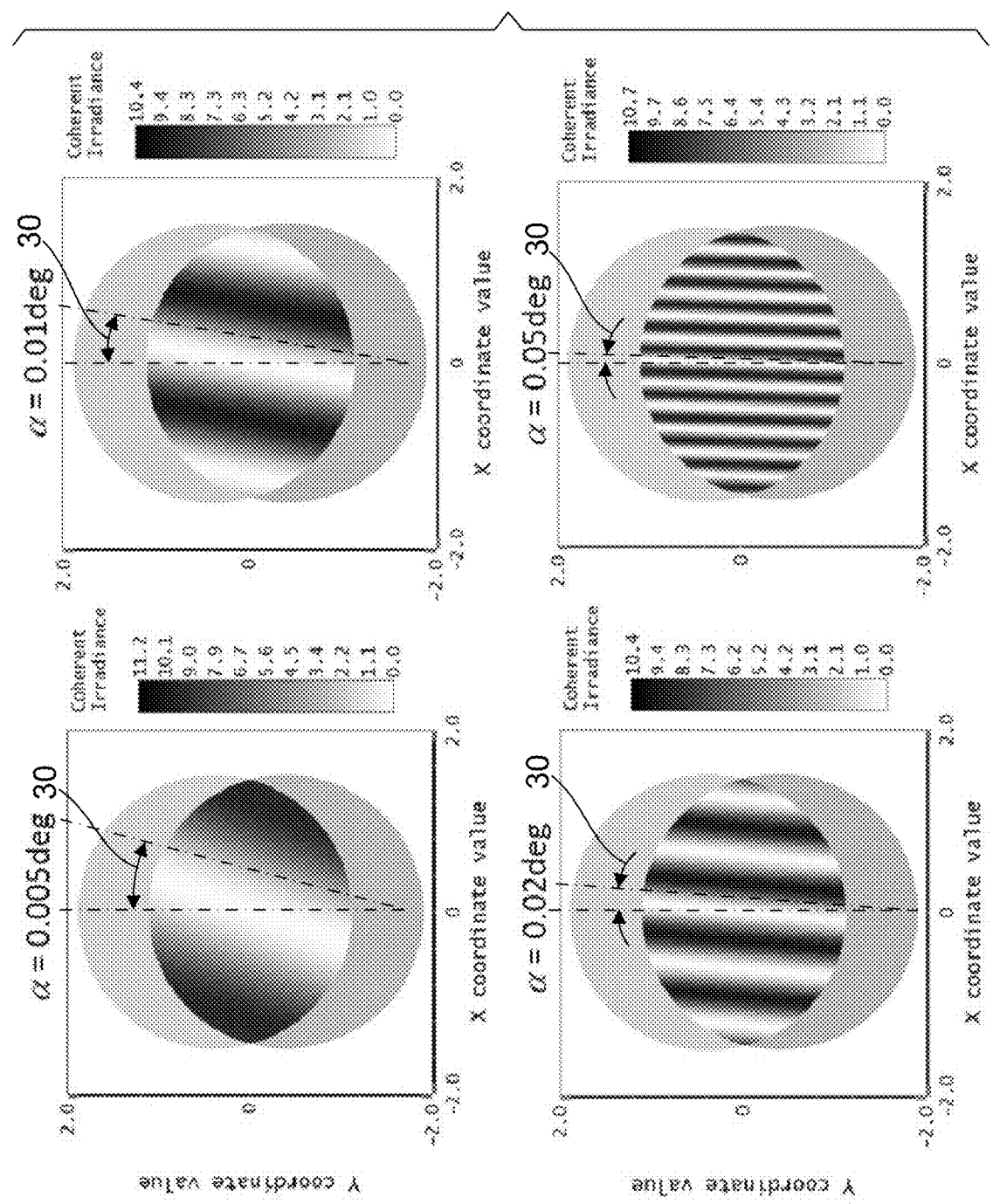
FIG. 12 are diagrams depicting interference patterns of various wedge angles of the wedge shear plate.

FIG. 12 are diagrams depicting interference patterns of various wedge angles a of the wedge shear plate with a setup similar to one found in FIG. 7, e.g., $\alpha=0.005, 0.01, 0.02$ and 0.05 degrees. Again, the wedge shear plate thickness is about 1 mm, the VD or r is 10 m and the incident wavelength $\lambda$ of the light source 4 is 550 nm. It shall be noted that the fringe distance d and the angular deviation $\beta$ are highly dependent on the wedge angle $\alpha$ and a smaller wedge angle produces a larger angular deviation $\beta$, resulting in the ease of $\beta$ angle measurement and thus a more accurate VD measurement. In one embodiment, the wedge angle of about 0.005-0.05 degrees are found to be effective for use with a present wedge shear plate 8.

Figure 14:
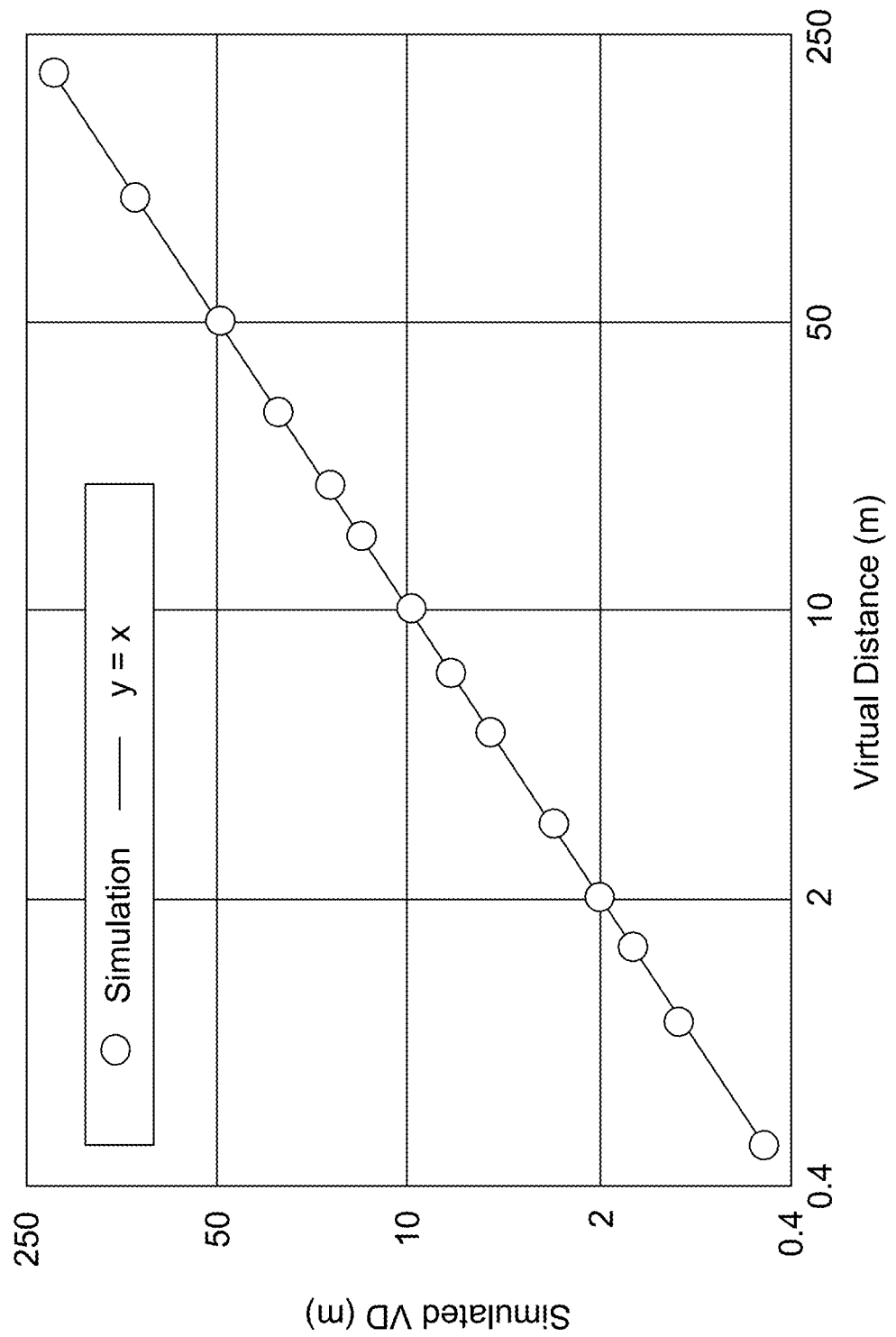
FIG. 14 is a diagram depicting simulated VDs or r values with respect to VDs.

FIG. 13 is a table depicting correlating VDs, angular deviations $\beta$ of interference patterns, fringe distances d and simulated VDs or r values. FIG. 14 is a diagram depicting simulated VDs or r values with respect to VDs. The shear distance 34 or s of the first interference pattern 50 is 0.75 mm and the incident wavelength $\lambda$ of the light source 4 is disposed at 550 nm. The accuracy of VD measurements is highly dependent upon the angular deviation of the fringe alignment from that of perfect collimation which is 90 degrees. For example, at least 0.5 degrees accuracy is required for <2 m VD measurement, 0.1 degrees accuracy for 2-10 m VD measurements, 0.01 degrees accuracy for 10-100 m VD measurements and 0.001 degrees accuracy for 100-200 m measurements. At 200 m, the VD measurements are close to the limit the present system can provide. The system shown in FIG. 7 may require a larger image sensor with small pixels as well as data processing algorithms to capture the small angle change when VD is beyond 200 m.

Figure 15:
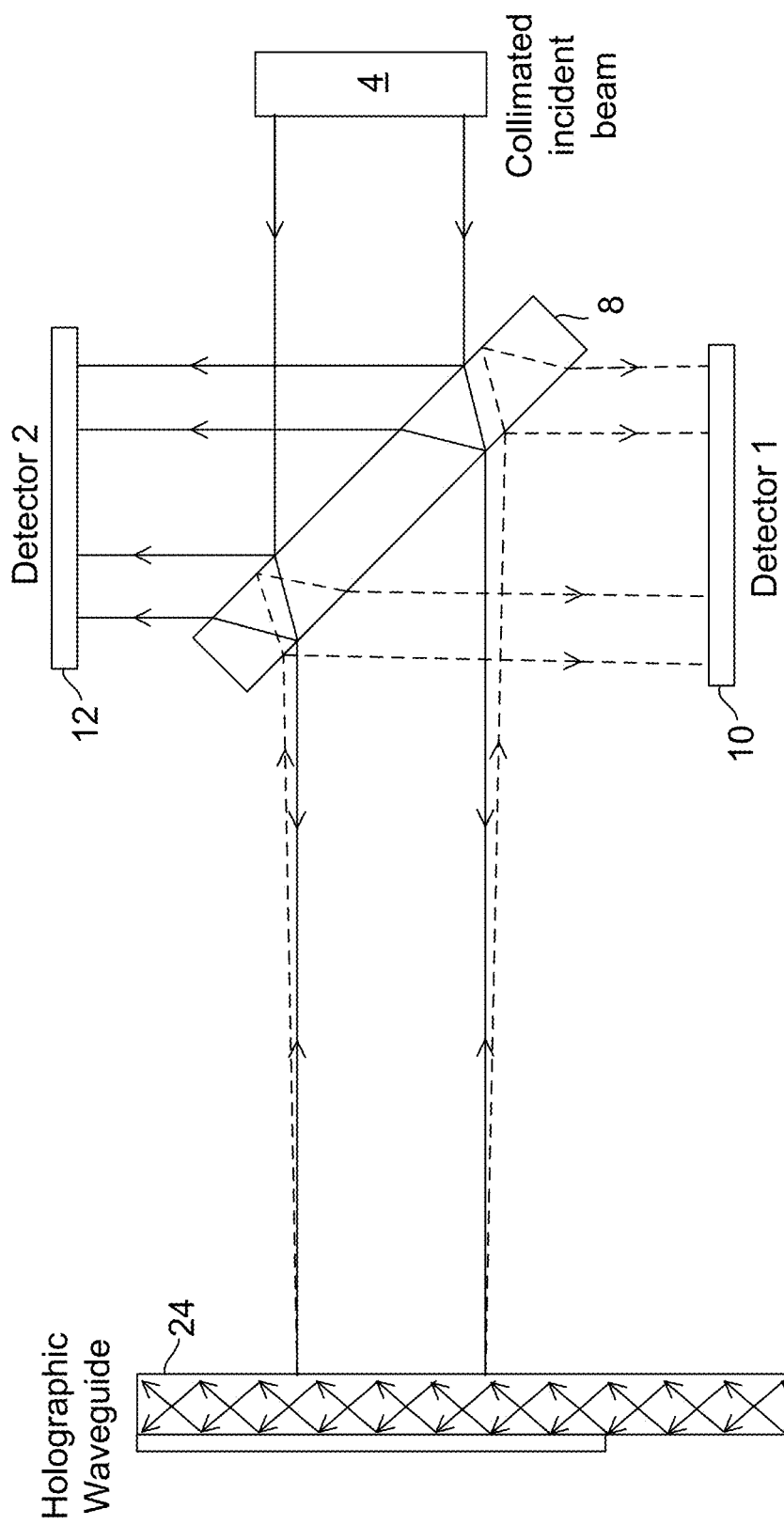
FIG. 15 is a diagram depicting one example application of the present system for measuring VDs.

FIG. 15 is a diagram depicting one example application of the present system for measuring VDs. In this example, the DUT is a holographic waveguide 24 coupled to a display panel module or light engine. In XR applications, holographic waveguides are critical components where the VDs must be properly determined to ensure that these optical components in the optical path of the XR systems are disposed accurately. Similar to the display panel modules, e.g., micro display panel modules, VD measurements are also important for holographic waveguides. The waveguide parallelism and related optical alignment are critical and required to be evaluated during the manufacturing stage and assembling process of the holographic waveguides.

Figure 16:
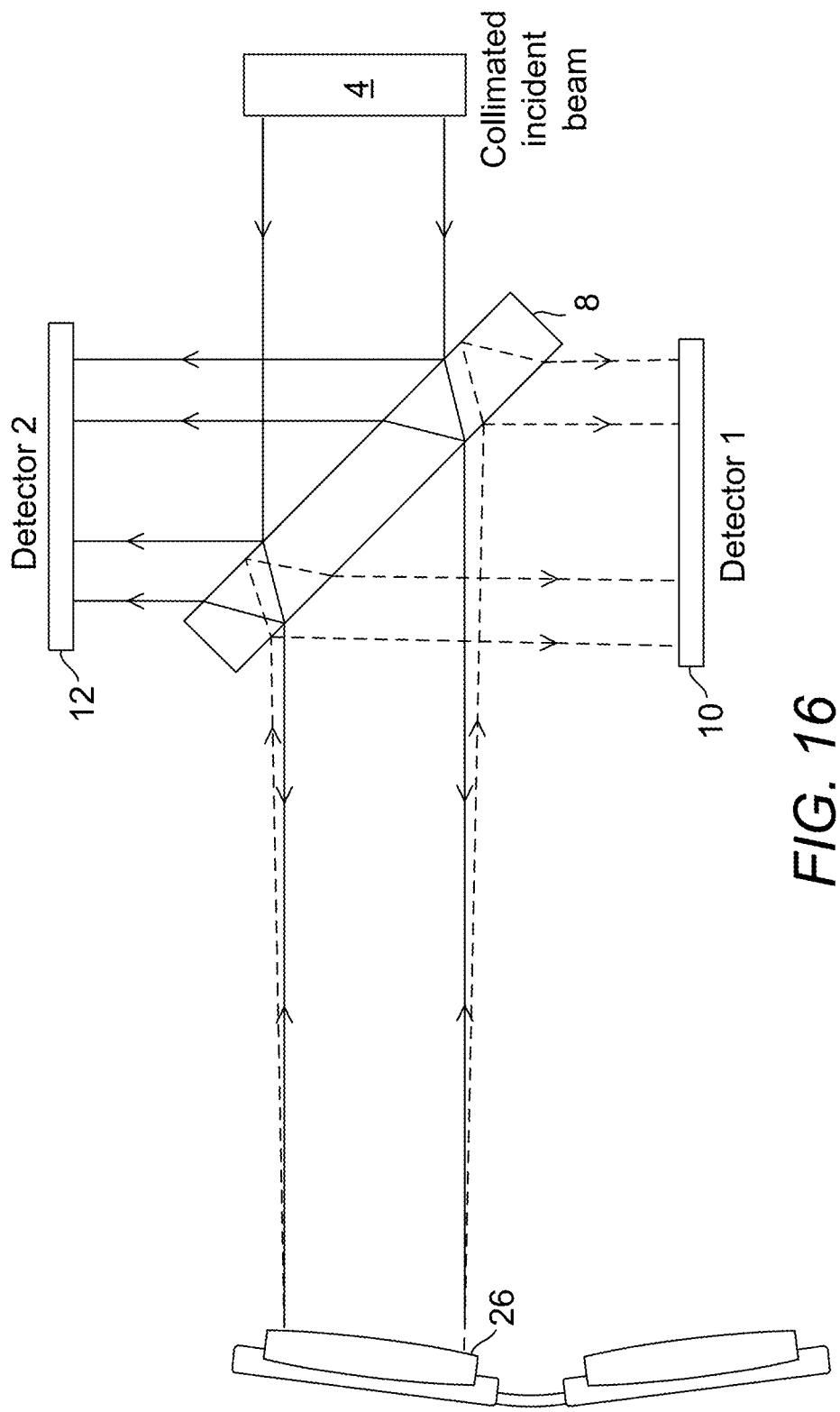
FIG. 16 is a diagram depicting another example application of the present system for measuring VDs.

FIG. 16 is a diagram depicting another example application of the present system for measuring VDs. In this example, the DUT is an XR glass 26. The VD accuracy is critically important in XR because it plays a crucial role in consistently creating a sense of immersion and presence in both virtual environment and actual surroundings. VD measurements provide the final assessment for XR glasses and systems, allowing for the accurate placement of virtual objects to create a sense of VD which is the perception of distance between two objects or locations in a virtual or augmented environment. If the VD is too far or too close, it can break the illusion of the augmented scene and make it difficult for the user to interact with a virtual object in a natural way. If the VD is incorrect, it can cause discomfort or even motion sickness in the user and break the sense of immersion in the virtual environment. Other examples of DUT include, but not limited to, a light engine, a near-eye display, a holographic projector, a head-up display (HUD), a naked eye 3D TV or any device producing VDs and virtual images.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A system for providing a virtual distance (VD) of a device under test, said system comprising:
   (a) a collimated light source;
   (b) a wedge shear plate comprising a first surface, a second surface and a wedge angle, wherein said second surface is disposed at said wedge angle with respect to said first surface, said wedge shear plate is configured to be disposed between the device under test and said light source and said wedge angle is about 0.005-0.05 degrees;
   (c) a first detector configured for receiving a first interference pattern formed as a result of a light beam of said collimated light source being disposed through and reflected by said first surface and said second surface of said wedge shear plate; and
   (d) a second detector configured for receiving a second interference pattern formed as a result of the light beam of said collimated light source being reflected by the device under test before being disposed through and reflected by said first surface and said second surface of said wedge shear plate and said wedge shear plate is disposed between said first detector and said second detector,
   wherein the VD is determined based on one or more properties of said first interference pattern, one or more properties of said second interference pattern, one or more properties of said collimated light source and one or more properties of said wedge shear plate.

2. The system of claim 1, wherein said one or more properties of said first interference pattern comprise a fringe distance (d), a shear distance (s) and an angular deviation ($\beta$).

3. The system of claim 1, wherein said one or more properties of said second interference pattern comprise an angular deviation ($\beta_0$).

4. The system of claim 1, wherein said one or more properties of said collimated light source comprise a wavelength ($\lambda$) of said collimated light source.

5. The system of claim 1, wherein said one or more properties of said wedge shear plate comprise a refractive index (n) of said wedge shear plate.

6. The system of claim 1, wherein the virtual distance is determined according to formula $r=-(sd)/(\lambda(\tan \beta - \tan \beta_0))$, wherein r=virtual distance, s=shear distance of said first interference pattern, d=fringe distance of said first interference pattern, $\lambda$=wavelength of said collimated light source, $\beta$=angular deviation of said first interference pattern and $\beta_0$=angular deviation of said second interference pattern.

7. The system of claim 1, wherein said first detector is directed in a first direction and said second detector is directed in a second direction opposite of said first direction.

8. The system of claim 1, wherein said collimated light source comprises a laser beam.

9. The system of claim 8, wherein said laser beam is a light beam selected from the group consisting of a single collimated plane-wave laser beam and a sphere-curved wave laser beam.

10. The system of claim 1, wherein said collimated light source is one of a reflective surface and a reflective plane.

11. The system of claim 1, wherein the device under test is a device selected from the group consisting of a display panel module, a light engine, a near-eye display, a holographic waveguide, a holographic projector, a head-up display (HUD), a naked eye 3D TV, an Extended Reality (XR) glass and a device producing VDs and virtual images.

12. The system of claim 1, wherein said wedge shear plate is configured to be disposed at substantially about 45 degrees between the device under test and said collimated light source.

13. A system for providing a virtual distance (VD) of a device under test, said system comprising:
(a) a collimated light source;
(b) a wedge shear plate comprising a first surface, a second surface and a wedge angle, wherein said second surface is disposed at said wedge angle with respect to said first surface, said wedge shear plate is disposed at substantially about 45 degrees between the device under test and said collimated light source and said wedge angle is about 0.005-0.05 degrees;
(c) a first detector configured for receiving a first interference pattern formed as a result of a light beam of said collimated light source being reflected by the device under test before being disposed through and reflected by said first surface and said second surface of said wedge shear plate; and
(d) a second detector configured for receiving a second interference pattern formed as a result of the light beam of said collimated light source being disposed through and reflected by said first surface and said second surface of said wedge shear plate and said wedge shear plate is disposed between said first detector and said second detector,
wherein the VD is determined based on one or more properties of said first interference pattern, one or more properties of said second interference pattern, one or more properties of said collimated light source and one or more properties of said wedge shear plate.

14. The system of claim 13, wherein the virtual distance is determined according to formula $r=-(sd)/(\lambda(\tan \beta - \tan \beta_0))$, wherein r=virtual distance, s=shear distance of said first interference pattern, d=fringe distance of said first interference pattern, $\lambda$=wavelength of said collimated light source, $\beta$=angular deviation of said first interference pattern and $\beta_0$=angular deviation of said second interference pattern.

15. The system of claim 13, wherein said collimated light source comprises a laser beam.

16. The system of claim 15, wherein said laser beam is a light beam selected from the group consisting of a single collimated plane-wave laser beam and a sphere-curved wave laser beam.

17. The system of claim 13, wherein said collimated light source is one of a reflective surface and a reflective plane.

18. The system of claim 13, wherein the device under test is a device selected from the group consisting of a display panel module, a light engine, a near-eye display, a holographic waveguide, a holographic projector, a head-up display (HUD), a naked eye 3D TV, an Extended Reality (XR) glass and a device producing VDs and virtual images.

* * * * *